US010072569B2

(12) United States Patent
Suciu et al.

(10) Patent No.: US 10,072,569 B2
(45) Date of Patent: Sep. 11, 2018

(54) GAS TURBINE ENGINE OIL TANK

(71) Applicant: United Technologies Corporation, Hartford, CT (US)

(72) Inventors: Gabriel L. Suciu, Glastonbury, CT (US); Nathan Snape, Tolland, CT (US); Christopher M. Dye, San Diego, CA (US)

(73) Assignee: United Technologies Corporation, Farmington, CT (US)

( * ) Notice: Subject to any disclaimer, the term of this patent is extended or adjusted under 35 U.S.C. 154(b) by 199 days.

(21) Appl. No.: 14/806,809

(22) Filed: Jul. 23, 2015

(65) Prior Publication Data

US 2015/0322854 A1 Nov. 12, 2015

Related U.S. Application Data

(63) Continuation of application No. 13/465,637, filed on May 7, 2012, now Pat. No. 9,194,294.

(51) Int. Cl.
| | | |
|---|---|---|
| *F02C 7/12* | (2006.01) | |
| *F02C 3/04* | (2006.01) | |
| *F02C 7/06* | (2006.01) | |
| *F01D 25/18* | (2006.01) | |
| *F02C 7/32* | (2006.01) | |

(Continued)

(52) U.S. Cl.
CPC ............... *F02C 3/04* (2013.01); *F01D 25/12* (2013.01); *F01D 25/18* (2013.01); *F02C 7/06* (2013.01); *F02C 7/12* (2013.01); *F02C 7/14* (2013.01); *F02C 7/32* (2013.01)

(58) Field of Classification Search
CPC ...... F02C 7/14; F02C 7/22; F02C 7/20; F01D 25/00; F01D 25/18; F01D 9/06; F01D 9/065

See application file for complete search history.

(56) References Cited

U.S. PATENT DOCUMENTS

| | | |
|---|---|---|
| 3,797,561 A | 3/1974 | Clark et al. |
| 4,041,697 A | 8/1977 | Coffinberry et al. |
| 4,947,963 A | 8/1990 | Aho, Jr. |

(Continued)

FOREIGN PATENT DOCUMENTS

| | | |
|---|---|---|
| EP | 1630358 | 3/2006 |
| EP | 2239440 | 10/2010 |

(Continued)

OTHER PUBLICATIONS

EP Search Report for European Patent Application No. 13787212.3 dated Nov. 19, 2015.

(Continued)

*Primary Examiner* — Steven Sutherland
(74) *Attorney, Agent, or Firm* — Carlson, Gaskey & Olds, P.C.

(57) ABSTRACT

A gas turbine engine includes an engine static structure housing that includes a compressor section and a turbine section. A combustor section is arranged axially between the compressor section and the turbine section. A core nacelle encloses the engine static structure to provide a core compartment. An oil tank is arranged in the core compartment and is axially aligned with the compressor section. A heat exchanger is secured to the oil tank and arranged in the core compartment.

19 Claims, 3 Drawing Sheets

(51) Int. Cl.
*F01D 25/12* (2006.01)
*F02C 7/14* (2006.01)

(56) References Cited

U.S. PATENT DOCUMENTS

| | | | |
|---|---|---|---|
| 5,054,281 A | * | 10/1991 | Mutch .................... B64D 33/08 138/39 |
| 5,351,476 A | | 10/1994 | Laborie et al. |
| 5,610,341 A | | 3/1997 | Tortora |
| 5,713,318 A | | 2/1998 | Tausk et al. |
| 6,282,881 B1 | | 9/2001 | Beutin et al. |
| 6,931,834 B2 | | 8/2005 | Jones |
| 7,377,098 B2 | | 5/2008 | Walker et al. |
| 7,681,402 B2 | | 3/2010 | Champion et al. |
| 2005/0279102 A1 | | 12/2005 | O'Connor |
| 2006/0042223 A1 | | 3/2006 | Walker et al. |
| 2006/0075754 A1 | | 4/2006 | Champion et al. |
| 2008/0093171 A1 | | 4/2008 | Portlock |
| 2009/0000308 A1 | | 1/2009 | Cloft et al. |
| 2009/0123274 A1 | | 5/2009 | Chaudhry |
| 2010/0043396 A1 | | 2/2010 | Coffinberry |
| 2010/0236213 A1 | | 9/2010 | Schilling |
| 2010/0326048 A1 | | 12/2010 | Lozier et al. |
| 2011/0247710 A1 | | 10/2011 | Siegfriedsen |

FOREIGN PATENT DOCUMENTS

| | | |
|---|---|---|
| GB | 1358076 | 6/1974 |
| GB | 2 437 377 | 12/2008 |
| WO | 97 02984 | 1/1997 |
| WO | 03048631 | 6/2003 |

OTHER PUBLICATIONS

International Preliminary Report on Patentability for PCT Application No. PCT/US2013/038231 dated Nov. 20, 2014.
International Search Report and Written Opinion for International Application No. PCT/US2013/038231 completed on Sep. 23, 2013.
Singapore Search Report for Singapore Patent No. 11201407138Q dated Oct. 2, 2015.
Garrett, "The TFE731: The Proven Technology of Double Flow Reactors" Allied Signal Technologies, 1987. 4 pages.
Notice of Opposition to European Patent No. EP 2847448 titled Gas Turbine Engine Oil Tank filed by Safran Aircraft Engines. Sep. 28, 2017.

* cited by examiner

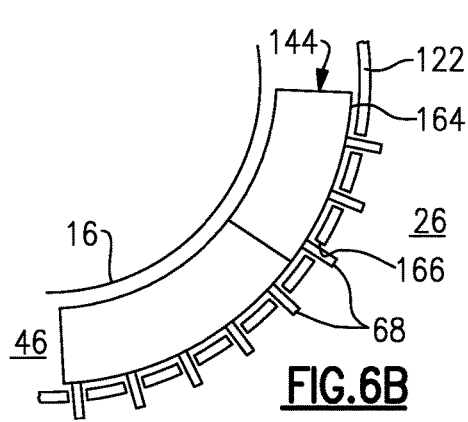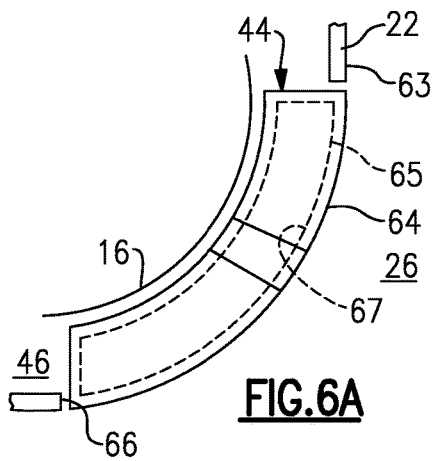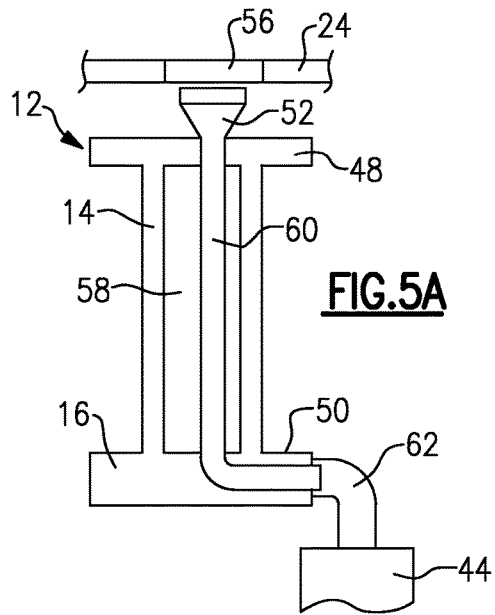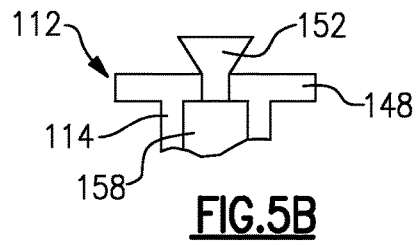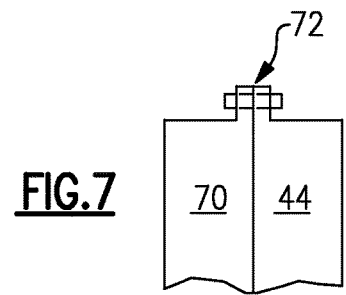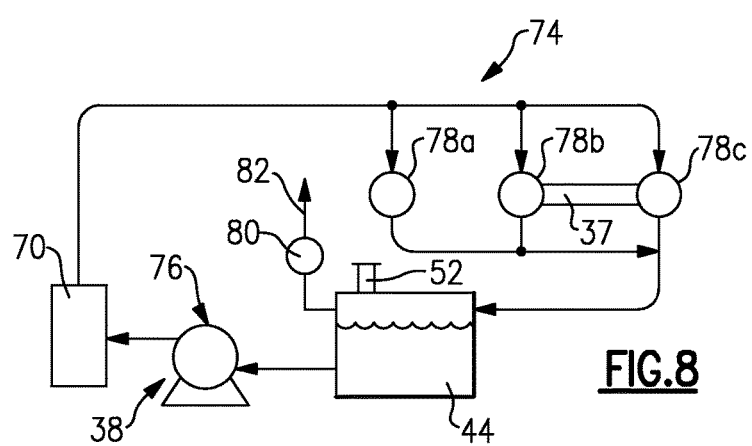

GAS TURBINE ENGINE OIL TANK

CROSS-REFERENCE TO RELATED APPLICATIONS

This application is a continuation of U.S. application Ser. No. 13/465,637 which was filed on May 7, 2012 and is incorporated herein by reference.

BACKGROUND

This disclosure relates to an oil tank for a gas turbine engine.

Lubrication systems for gas turbine engines require significant amounts of lubrication oil, which must be provided to numerous internal and external components during operation. Typically, an oil pump is mounted on an accessory gearbox, which may be located at various locations relative to the gas turbine engine, for example, within core and/or fan nacelles.

Oil tanks are typically located in the vicinity of the accessory gearbox, with fluid lines running to the gearbox, oil pump, engine sump and oil coolers, for example. Due to packaging constraints, the oil tank may be located near the hot section of the gas turbine engine, for example, in the vicinity of the combustor section and the turbine section. Alternatively, the oil tank may be packaged in a fan nacelle due to spatial constraints about the core.

SUMMARY

In one exemplary embodiment, a gas turbine engine includes an engine static structure housing that includes a compressor section and a turbine section. A combustor section is arranged axially between the compressor section and the turbine section. A core nacelle encloses the engine static structure to provide a core compartment. An oil tank is arranged in the core compartment and is axially aligned with the compressor section. A heat exchanger is secured to the oil tank and arranged in the core compartment.

In a further embodiment of any of the above, the compressor section includes a low pressure compressor section that is arranged axially upstream from a high pressure compressor section. The oil tank is axially aligned with at least a portion of the low pressure compressor section.

In a further embodiment of any of the above, the compressor and turbine sections are mounted on at least one spool, and the engine includes a fan case that houses a fan connected to the spool. A fan nacelle encloses the fan case, and a bypass flow path is provided between the core and fan nacelles.

In a further embodiment of any of the above, the gas turbine engine includes a radial structure that interconnects the engine static structure and the fan case. A lubrication passage extends through the radial structure, and a tube fluidly interconnects the lubrication passage to the oil tank.

In a further embodiment of any of the above, the radial structure includes flow exit guide vanes.

In a further embodiment of any of the above, the flow exit guide vane includes a radially extending cavity that provides the lubrication passage.

In a further embodiment of any of the above, the flow exit guide vane includes a radially extending cavity. A conduit is arranged in the cavity and fluidly connects to the tube.

In a further embodiment of any of the above, the gas turbine engine includes a fill tube mounted to the fan case. The fan nacelle includes a cover configured to be removably secured over the fill tube.

In a further embodiment of any of the above, the fan nacelle includes a cover configured to be removably secured over the fill tube.

In a further embodiment of any of the above, the gas turbine engine includes at least one bearing compartment that is configured to support the spool, and a lubrication system having a gearbox that is arranged in the core compartment and includes a lubrication pump. The lubrication pump us fluidly connected to the oil tank and the bearing compartment.

In a further embodiment of any of the above, the gas turbine engine includes a heat exchanger that is secured to the oil tank.

In a further embodiment of any of the above, the oil tank includes a portion that extends through an opening in the core nacelle and is exposed to the bypass flow path.

In a further embodiment of any of the above, the oil tank includes an exterior surface that is arranged in the opening. The core nacelle has an outer contour facing the bypass flow path, and the exterior surface following the outer contour.

In a further embodiment of any of the above, the oil tank is arcuate in shape and is arranged axially forward of a gearbox mounted to the engine static structure.

In a further embodiment of any of the above, the oil tank includes a wall having fins that extend through slots providing the opening and into the bypass flow path.

In another exemplary embodiment, A gas turbine engine includes an engine static structure that is supported relative to a fan case by a radial structure. An oil tank is mounted to the engine static structure. An oil fill tube is mounted to the fan case and is fluidly connected to the oil tank. A fan nacelle enclosing the fan case and including a removable cover arranged over the oil fill tube.

In a further embodiment of any of the above, the gas turbine engine includes a core nacelle enclosing the engine static structure to provide a core compartment. The oil tank is arranged in the core compartment.

In a further embodiment of any of the above, the gas turbine engine includes a lubrication passage that is arranged in the radial structure fluidly interconnecting the oil fill tube to the oil tank.

In another exemplary embodiment, a gas turbine engine includes an engine static structure that is supported relative to a fan case by a radial structure. A lubrication passage extends through the radial structure. The engine static structure houses a compressor section and a turbine section. A combustor section is arranged axially between the compressor section and the turbine section. A core nacelle encloses the engine static structure to provide a core compartment. An oil tank is arranged in the core compartment and axially aligned with the compressor section. A heat exchanger is secured to the oil tank and arranged in the core compartment. An oil fill tube is mounted to the fan case and fluidly interconnects the lubrication passage to the oil tank. A fan nacelle encloses the fan case and includes a removable cover arranged over the oil fill tube.

BRIEF DESCRIPTION OF THE DRAWINGS

The disclosure can be further understood by reference to the following detailed description when considered in connection with the accompanying drawings wherein:

FIG. 5A is a schematic cross-sectional view of a fan case and static structure with a radial structure having example lubrication passage.

FIG. 5B is a schematic cross-sectional view of another example fan case, radial structure and lubrication passage.

FIG. 6A is an end view of an example oil tank.

FIG. 6B is an end view of another example oil tank.

FIG. 7 is a schematic depiction of a heat exchanger mounted to the example oil cooler.

FIG. 8 is a schematic view of an example lubrication system.

DETAILED DESCRIPTION

Figure 1:
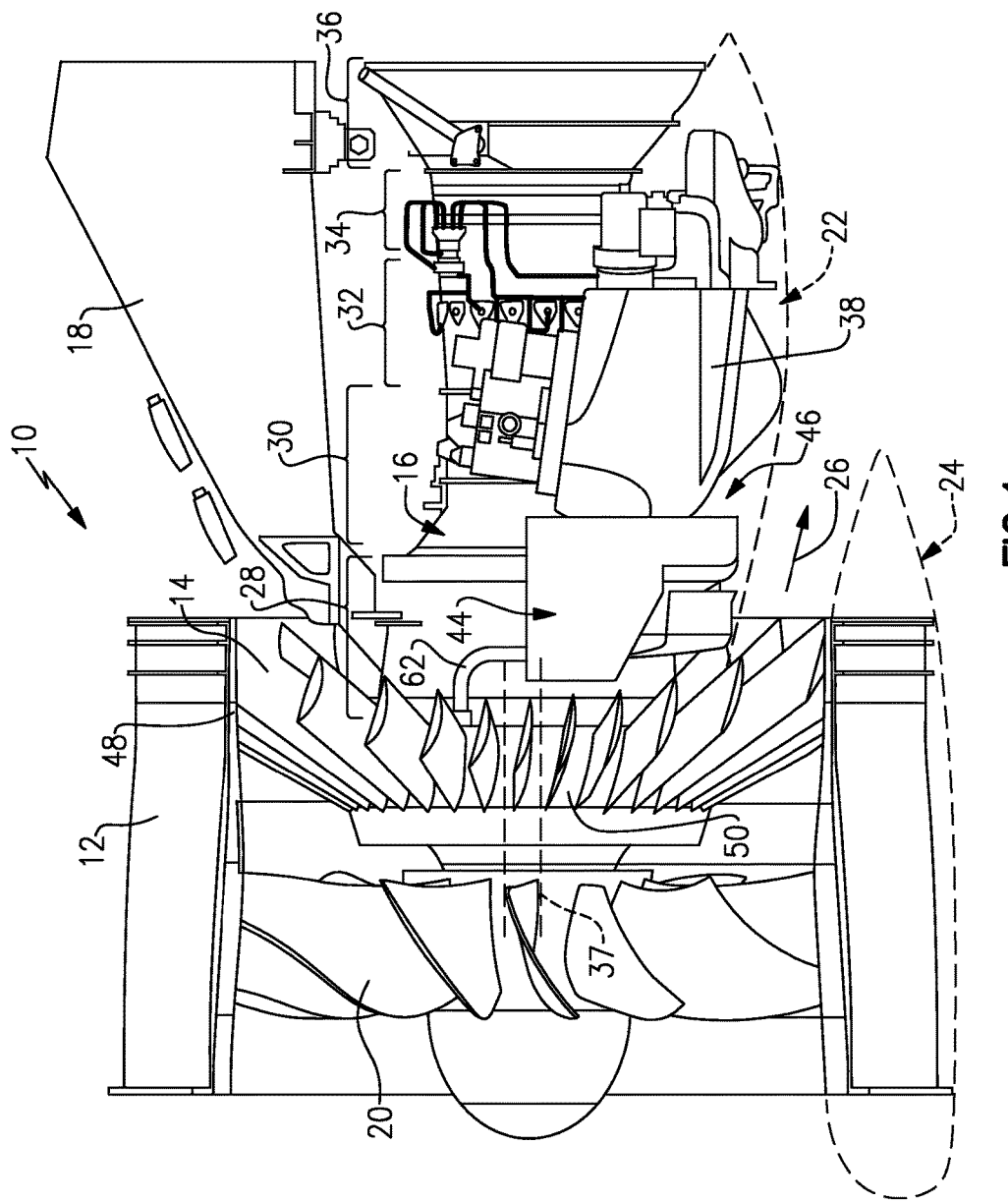
FIG. 1 is a schematic side perspective view of an example gas turbine engine.

An exemplary gas turbine engine 10 is schematically depicted in FIG. 1. The engine 10 may be a high bypass engine, as shown, or any other desired configuration. It should be understood that the disclosed features, such as the oil tank, oil fill and core nacelle described below may relate to other types of engines.

The engine 10 includes a fan case 12 supported relative to an engine static structure 16 by radial structure 14, such as flow exit guide vanes. Alternatively, struts may provide the radial structure 14. The engine 10 is supported relative to an airframe by a pylon 18.

A fan 20 is housed within the fan case 12, and a fan nacelle 24 surrounds the fan case 12. A core nacelle 22 surrounds the engine static structure 16 and provides a bypass flowpath 26 together with the fan nacelle 24.

The positions of a low pressure compressor section 28, high pressure compressor section 30, combustor section 32, high pressure turbine section 34, and low pressure turbine section 36 within the engine static structure 16 are schematically depicted. The example engine 10 includes a dual spool arrangement in which the low pressure compressor section 28 and low pressure turbine section 36 are mounted on an inner spool, and the high pressure compressor section 30 and high pressure turbine section 34 are mounted on an outer spool. A spool 37 is schematically depicted in FIG. 1 and may be an inner spool, for example, coupled to the fan 20 directly or by a geared architecture.

Figure 4:
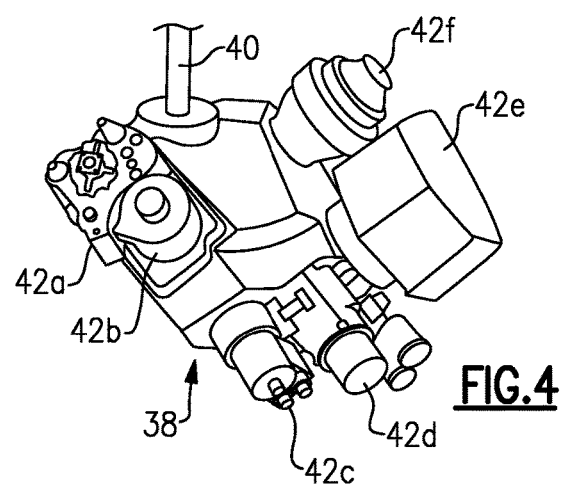
FIG. 4 is a perspective view of an example accessory gearbox.

An accessory gearbox 38, which may be V-shaped for packaging, is mounted on the engine static structure 16. Referring to FIG. 4, the gearbox 38 includes an input shaft 40 coupled to at least one spool within the engine 10 to provide rotational drive to accessory drive components 42A-42E mounted on the gearbox 38. The accessory drive components 42A-42E may include an oil pump, a fuel pump, a hydraulic pump, a starter and a generator, for example. In the example, the gearbox 38 is generally axially aligned with the compressor section of the engine 10.

A core compartment 46 is provided between the core nacelle 22 and the engine static structure 16. The gearbox 38 is arranged within the core compartment 46. An oil sump or oil tank 44 is also housed within the core compartment 46 in a position axially forward of the gearbox 38, as best shown in FIG. 1. In the example shown, the oil tank 44 is axially aligned with the compressor section, and in one example, axially aligned and outboard of the low pressure compressor section 28.

Figure 2:
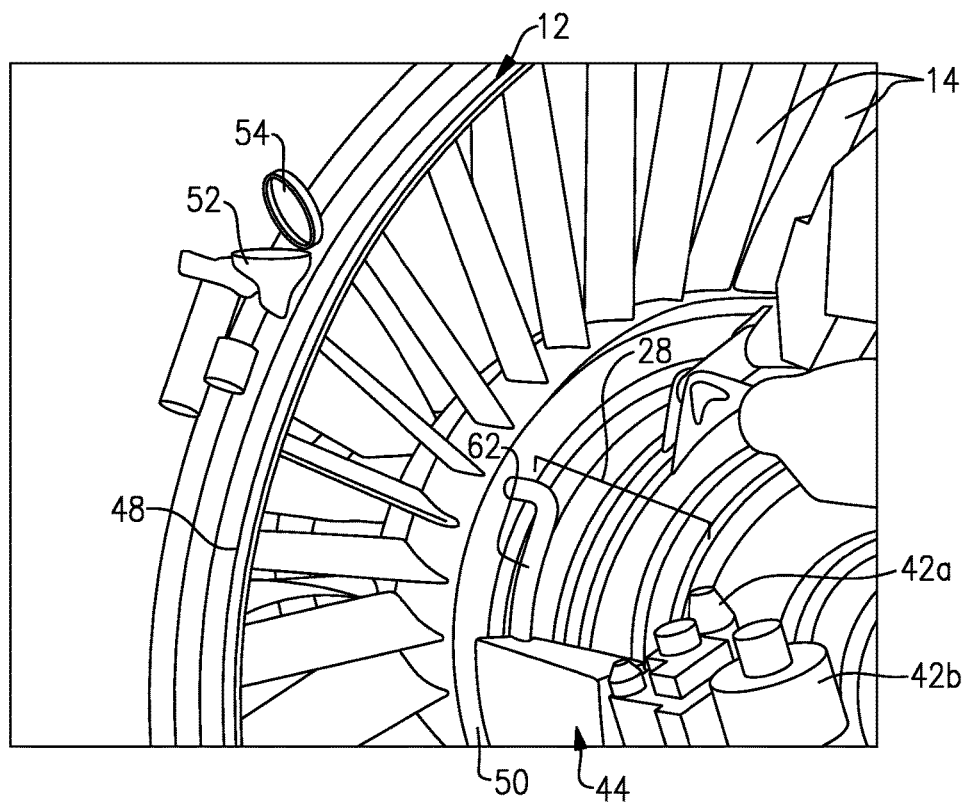
FIG. 2 is another perspective view of the gas turbine engine shown in FIG. 1.
Figure 3:
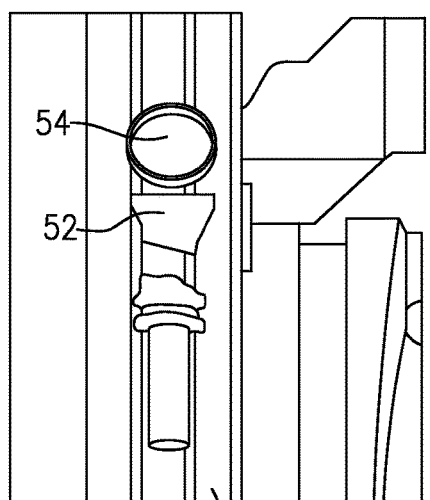
FIG. 3 is a top elevational view of the gas turbine engine in the area of a fan case.

Referring to FIGS. 1 and 2, the fan case 12 provides an outer structure 48. An inner structure 50 may be provided by the engine static structure 16, for example. The flow exit guide vanes 14 extend between and interconnect the outer and inner structure 48, 50. Referring to FIGS. 2 and 3, a fill tube 52 may be mounted on the outer structure 48 to provide oil to the oil tank 44. A cap 54 may be secured over the fill tube 52 to provide a seal. A tube 62 carries the oil from the oil fill tube 52 to the oil tank 44, as best illustrated in FIG. 2.

Referring to FIG. 5A, the fan nacelle 24 includes a cover 56 that is removably secured over the oil fill tube 52, thus providing access to the oil tank 44 for providing additional oil at service intervals. In the example illustrated in FIG. 5A, a fluid conduit 60 extends to a cavity 58 in the flow exit guide vane 14 to fluidly connect the fill tube 52 to the tube 62. In an example illustrated in FIG. 5B, the fan case 112 provides the outer structure 148. The cavity 158 is "wet" such that oil from the fill tube 152 flows through the flow exit guide vane 114 and contacts the surfaces of the cavity 158, thus eliminating the need for additional tubing.

The oil tank 44 is configured in an arcuate shape for packaging within the core compartment 46 between the core nacelle 22 and the engine static structure 16. The core nacelle 22 provides an outer contour 63 that is circular in shape. The core nacelle 22 includes an opening 66, which exposes an exterior surface 64 of an outer wall 65 of the oil tank 44. Oil within the cavity 67 of the oil tank 44 convectively transfers heat to the bypass flowpath 26 with the exterior surface 64 exposed.

Referring to FIG. 6B, the oil tank 144 includes fins 68 that extend through slots provided by the opening 166. The core nacelle 122 covers much of the oil tank 44 for protection from debris while permitting portions, such as the fins 68, to extend into the bypass flowpath 26 for improved heat transfer.

Referring to FIG. 7, a heat exchanger 70 may be mounted to the oil tank 44 using a fastening arrangement 72. Alternatively, the heat exchanger 70 may be integrally formed and share a common wall with the oil tank 44. The heat exchanger 70 may be exposed to airflow in some suitable fashion.

An example lubrication system 74 is schematically illustrated in FIG. 8. The lubrication system 74 includes a lubrication pump 76, which may be an accessory driven by the gearbox 38. The pump 76 may provide oil to the heat exchanger 70 for cooling. The cooled oil is provided to multiple components within the engine 10, for example, bearing compartments 78A-78C. The bearings may support the spool 37. The oil from the bearing compartment 78A-78C is returned to the oil tank 44. A de-aerator 80 may be fluidly connected to the oil tank 44 and may also include a vent 82 for venting air within the oil tank 44 to atmosphere. Oil may be added to the oil tank 44 by the fill tube 52, described above.

Although example embodiments have been disclosed, a worker of ordinary skill in this art would recognize that certain modifications would come within the scope of the claims. For that reason, the following claims should be studied to determine their true scope and content.

What is claimed is:

1. A gas turbine engine comprising:
   an engine static structure housing a compressor section and a turbine section, and a combustor section arranged axially between the compressor section and the turbine section;
   a core nacelle enclosing the engine static structure to provide a core compartment;
   an oil tank arranged in the core compartment and axially aligned with the compressor section;

a heat exchanger secured to the oil tank and arranged in the core compartment; and a lubrication pump configured to provide oil from the oil tank to the heat exchanger.

2. The gas turbine engine according to claim 1, wherein the compressor section includes a low pressure compressor section arranged axially upstream from a high pressure compressor section, the oil tank axially aligned with at least a portion of the low pressure compressor section.

3. The gas turbine engine according to claim 1, wherein the compressor and turbine sections are mounted on at least one spool, and comprising a fan case housing a fan connected to the at least one spool, a fan nacelle enclosing the fan case, and a bypass flow path provided between the core and fan nacelles.

4. The gas turbine engine according to claim 3, comprising radial structure interconnecting the engine static structure and the fan case, a lubrication passage extending through the radial structure, and a tube fluidly interconnecting the lubrication passage to the oil tank.

5. The gas turbine engine according to claim 4, wherein the radial structure includes flow exit guide vanes.

6. The gas turbine engine according to claim 5, wherein the flow exit guide vane includes a radially extending cavity providing the lubrication passage.

7. The gas turbine engine according to claim 5, wherein the flow exit guide vane includes a radially extending cavity, and a conduit arranged in the cavity and fluidly connected to the tube.

8. The gas turbine engine according to claim 4, comprising a fill tube mounted to the fan case, wherein the fan nacelle includes a cover configured to be removably secured over the fill tube.

9. The gas turbine engine according to claim 3, comprising at least one bearing compartment configured to support the spool, and a lubrication system having a gearbox arranged in the core compartment, the lubrication pump fluidly connected to the oil tank and the bearing compartment.

10. The gas turbine engine according to claim 3, wherein the oil tank includes a portion extending through an opening in the core nacelle and exposed to the bypass flow path.

11. The gas turbine engine according to claim 1, wherein the lubrication pump is arranged fluidly between the oil tank and the heat exchanger.

12. A gas turbine engine comprising:
an engine static structure housing a compressor section and a turbine section, and a combustor section arranged axially between the compressor section and the turbine section;
a core nacelle enclosing the engine static structure to provide a core compartment;
an oil tank arranged in the core compartment and axially aligned with the compressor section, wherein the oil tank includes an exterior surface arranged in an opening of the core nacelle, the core nacelle having an outer contour facing the bypass flow path, and the exterior surface following the outer contour; and
a heat exchanger secured to the oil tank and arranged in the core compartment.

13. The gas turbine engine according to claim 12, wherein the oil tank is arcuate in shape and arranged axially forward of a gearbox mounted to the engine static structure.

14. The gas turbine engine according to claim 13, wherein the oil tank includes a wall having fins extending through slots providing the opening and into the bypass flow path.

15. The gas turbine engine according to claim 12, wherein the oil tank includes a portion extending through an opening in the core nacelle and exposed to the bypass flow path.

16. A gas turbine engine comprising:
an engine static structure supported relative to a fan case by a radial structure;
an oil tank mounted to the engine static structure;
an oil fill tube mounted to the fan case and fluidly connected to the oil tank; and
a fan nacelle enclosing the fan case, the fan nacelle provides a removable cover directly connected to the fan nacelle and arranged over the oil fill tube.

17. The gas turbine engine according to claim 16, comprising a core nacelle enclosing the engine static structure to provide a core compartment, the oil tank arranged in the core compartment.

18. The gas turbine engine according to claim 17, comprising a lubrication passage arranged in the radial structure fluidly interconnecting the oil fill tube to the oil tank.

19. A gas turbine engine comprising:
an engine static structure supported relative to a fan case by a radial structure, a lubrication passage extending through the radial structure, the engine static structure housing a compressor section and a turbine section, and a combustor section arranged axially between the compressor section and the turbine section;
a core nacelle enclosing the engine static structure to provide a core compartment;
an oil tank arranged in the core compartment and axially aligned with the compressor section;
a heat exchanger secured to the oil tank and arranged in the core compartment;
an oil fill tube mounted to the fan case, and the lubrication passage fluidly interconnecting the oil fill tube to the oil tank; and
a fan nacelle enclosing the fan case, the fan nacelle provides a removable cover arranged over the oil fill tube.

* * * * *